US011910513B2

(12) United States Patent
Lu et al.

(10) Patent No.: US 11,910,513 B2
(45) Date of Patent: Feb. 20, 2024

(54) VAPORIZATION DEVICE WITH ACTIVATION PROTECTION

(71) Applicant: SHENZHEN GEEKVAPE TECHNOLOGY CO., LTD., Shenzhen (CN)

(72) Inventors: Wenlong Lu, Shenzhen (CN); Xianghui Wang, Shenzhen (CN); Renjie Gao, Shenzhen (CN)

(73) Assignee: SHENZHEN GEEK VAPE TECHNOLOGY CO., LTD., Shenzhen (CN)

( * ) Notice: Subject to any disclaimer, the term of this patent is extended or adjusted under 35 U.S.C. 154(b) by 1185 days.

(21) Appl. No.: 16/386,256

(22) Filed: Apr. 17, 2019

(65) Prior Publication Data

US 2020/0305514 A1 Oct. 1, 2020

Related U.S. Application Data

(63) Continuation of application No. PCT/CN2019/079860, filed on Mar. 27, 2019.

(51) Int. Cl.
*H05B 6/66* (2006.01)

(52) U.S. Cl.
CPC .................................... *H05B 6/666* (2013.01)

(58) Field of Classification Search
CPC .......... A24F 40/10; A24F 40/53; A24F 40/44; A24F 40/50; A24F 40/60; A24F 15/01; A24F 40/40; A24F 40/42; A24F 40/46; A24F 40/465; A24F 40/485; A24F 40/51; A24F 40/95; H05B 1/0227; H05B 1/0297; H05B 1/02; H05B 1/0211; H05B 1/0216; H05B 1/0244; H05B 3/0014; H05B 6/108; H05B 6/36
USPC .......................... 131/329, 328; 392/386, 387
See application file for complete search history.

(56) References Cited

U.S. PATENT DOCUMENTS

2016/0143359 A1* 5/2016 Xiang .................... A24F 40/53 392/386
2016/0205999 A1* 7/2016 Liu .......................... H05B 3/46
2017/0238527 A1* 8/2017 Wynalda, Jr. ............. A61L 9/12
2017/0325289 A1* 11/2017 Liu ...................... H05B 1/0227
2018/0360120 A1* 12/2018 Huang .................... A24F 40/46

* cited by examiner

*Primary Examiner* — Chris Q Liu
(74) *Attorney, Agent, or Firm* — BAYES PLLC

(57) ABSTRACT

An electronic vaporization device with activation protection is provided. The electronic vaporization device includes a heater for heating a vaporizable material and a compartment housing the vaporizable material, said compartment being thermally connected to the heater. The electronic vaporization device further includes a power source providing electric power to the heater, said electric power being converted to thermal power. The electronic vaporization device further includes two or more contact points disposed on the outside surface of the electronic vaporization device. The electric power is provided when the two or more contact points are physically connected to an object having a resistance within a predetermined range.

13 Claims, 10 Drawing Sheets

200

241

300

341

402

406

500

VAPORIZATION DEVICE WITH ACTIVATION PROTECTION

CROSS REFERENCE TO RELATED APPLICATION

This application is continuation of International Application No. PCT/CN2019/079860, filed on Mar. 27, 2019, entitled "VAPORIZATION DEVICE WITH ACTIVATION PROTECTION," which is hereby incorporated by reference in its entirety.

TECHNICAL FIELD

The present disclosure relates to a vaporization device with activation protection, and more particularly to an electronic vaporization device using two or more contact points for protecting the device from being inadvertently activated.

BACKGROUND

A vaporization device, such as an electronic cigarette or e-cigarette, has become a popular alternative to a traditional tobacco cigarette in recent years, partly for the reason that a majority of toxicants commonly found in tobacco smoke do not exist in vapor inhaled by user of the vaporization device. In addition, a vaporization device is more entertaining than tobacco as the e-liquid, a liquid mixture vaporized by the device, has thousands of flavors for user to choose from.

Since its inception in early 2000s, a modern electronic vaporization device ("EVD") has continuously evolved in its design. Existing designs of the EVD are lighted by a start button, a microphone (MIC) sensor, or a switch. Such a configuration tends to inadvertently activate the EVD, thus leading to leakage of the vaporizable material in the EVD, and/or causing damage to the electric circuits of the EVD. Inadvertent activation may also cause fire because of the inflammation of the electric circuits and/or other parts of the EVD. The potential danger of inadvertent activation makes the EVD less reliable for frequent users compared to traditional tobacco and also makes the EVD less favorable an alternative to cigarette smokers.

In light of the above, there is a need to re-design the vaporization device to mitigate its danger of inadvertent activation.

SUMMARY

The present disclosure relates to apparatuses, systems, and methods with respect to an EVD. More specifically, such an EVD may include two or more contact points on the outside surface of the EVD, and electric power is provided in the EVD when the two or more contact points are physically connected to an object having a resistance within a predetermined range.

In one aspect, embodiments of the disclosure provide an EVD. The EVD may include a heater for heating a vaporizable material and a compartment housing the vaporizable material, said compartment being thermally connected to the heater. The EVD may also include a power source providing electric power to the heater, said electric power being converted to thermal power. The EVD may further include two or more contact points disposed on the outside surface of the EVD. The electric power may be provided when the two or more contact points are physically connected to an object having a resistance within a predetermined range.

In another aspect, embodiments of the disclosure provide a system for providing electric power to a heater of an EVD. The system may include a power source and a power supply circuit for supplying electric power from the power source to the heater. The system may also include a detection circuit for detecting whether an object having a resistance within a predetermined range is physically connected to two or more contact points disposed on the outside surface of the EVD. The system may further include a starter circuit for turning on or turning off the power supply circuit. The starter circuit may turn on the power supply circuit when the detection circuit detects that the two or more contact points are physically connected to the object having a resistance within a predetermined range.

In a further aspect, embodiments of the disclosure provide a method for generating an aerosol with an EVD. The method may include providing a heater for heating a vaporizable material to generate an aerosol and providing a compartment housing the vaporizable material, said compartment being thermally connected to the heater. The method may also include providing a power source that provides electric power to the heater, said electric power being converted to thermal power. The method may further include providing two or more contact points disposed on the outside surface of the electronic vaporization device. The electric power may be provided when the two or more contact points are physically connected to an object having a resistance within a predetermined range.

It is to be understood that both the foregoing general description and the following detailed description are exemplary and explanatory only and are not restrictive of the invention, as claimed.

DETAILED DESCRIPTION

Figure 1:
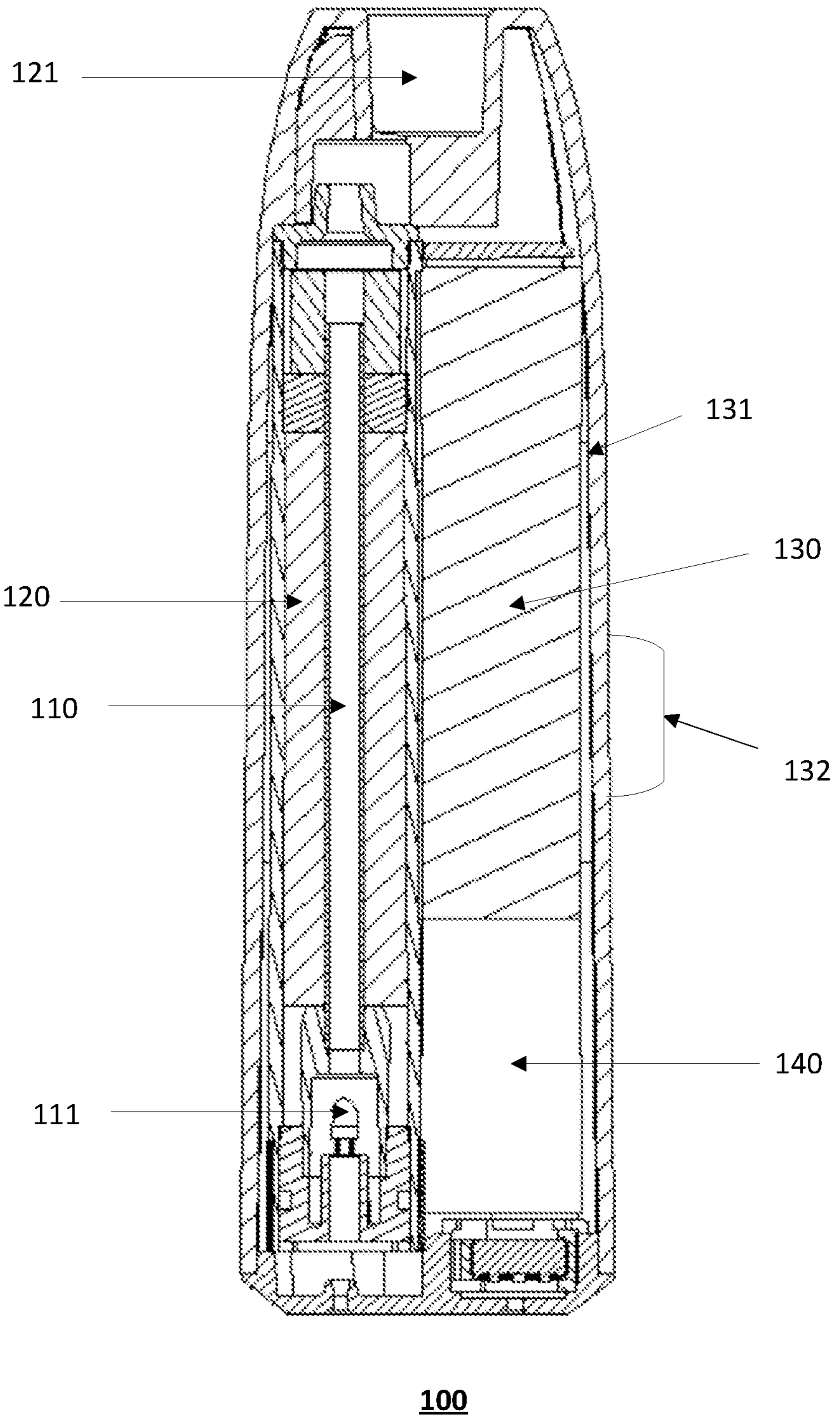
FIG. 1 illustrates a schematic diagram of an exemplary vaporization device, consistent with some disclosed embodiments.

Reference will now be made in detail to the exemplary embodiments, examples of which are illustrated in the accompanying drawings. Wherever possible, the same reference numbers will be used throughout the drawings to refer to the same or like parts.

In some embodiments according to the present disclosure, an EVD may vaporize a vaporizable material, such as propylene glycol (PG), vegetable glycerin (VG), or flavorings, stored in a chamber of a cartridge of the device by providing heat using a heat source and/or a heater inside the device. The heat source may be powered by electricity to raise the temperature of the heater inside the device, thereby vaporizing the vaporizable material. The electricity may be provided by a power supply circuit when a detection circuit detected that an object having a resistance within a predetermined range physically connects two or more contact points disposed on the outside surface of the EVD. Here, "physically connect(ed)" or "physical connection" has the meaning that the object touches the contact points so that electricity may pass through the object and the contact points. The "predetermined range" of a resistance may include at least a range from a minimum resistance to a maximum resistance between any two parts of a human body, such as a palm and a mouth, two or more fingers, upper and lower lips, etc.

The term "contact point(s)" used throughout this disclosure is not limited to the only example of a geometric element having zero dimensions. Rather, a "contact point" according to the present disclosure may include various examples, such as a contact area, a contact bar, a contact side, etc., as long as the contact point provides a terminal for electricity to pass through. Moreover, the number of contact points according to the present disclosure may not be limited to two. More than two contact points may also be employed to increase the safety of the EVD against inadvertent connection of two contact points. In an example where three contact points are used, they may respectively touch a mouth and two fingers of a hand. In another example where four contact points are used, they may respectively touch an upper lip, a lower lip, and two fingers of a hand. Consistent with some embodiments according to the present disclosure, one or more of the contact points may be covered by a protective member (e.g., a plastic cover slightly larger than the total area of the contact point to be protected), so that the contact points may only be physically connected to the object by first removing the protective member, therefore further increasing the safety against inadvertent activation of the EVD.

The EVD according to the present disclosure may include a detection circuit that detects the physical connection between an object having a resistance within a predetermined range and two or more contact points disposed on the outside surface of the EVD. When the two or more contact points are physically connected to the object, a circuit path may be formed. Depending on the value of resistance, the current flowing in the circuit path may vary. In some embodiments, the detection circuit may be able to sense a predetermined range of current that passes through the circuit path, thus causing electric power to be provided from a power source to a heater. If the current drops below or exceeds the predetermined range, no electric power is provided to the heater. The range of current may correspond to a range of resistance of the object, for example, from 0Ω to 1 MΩ. The resistance of a human body normally ranges from 500Ω to 100,000Ω. Therefore, once the operation voltage of the detection circuit is known, the range of current detectable by the detection circuit may determine the range of resistance of an object that may trigger the provision of electric power.

Consistent with some embodiments according to the present disclosure, the EVD may optionally include an amplifier circuit for amplifying the electric signal output from the detection circuit. When the output signal from the detection circuit is too small to turn on a starter circuit, the amplifier circuit may be provided to increase the output signal and apply the increased signal to the starter circuit, so that a power supply circuit may be turned on by the starter circuit and cause the electric power to be provided to the heater.

Consistent with some embodiments according to the present disclosure, the EVD may further include a starter circuit for turning on or turning off a power supply circuit. In some embodiments, the starter circuit may include a complementary metal-oxide-semiconductor (CMOS) switch. A CMOS switch usually includes a pair of p-type and n-type metal oxide semiconductor field effect transistors (MOSFETs) and a gate electrode controlling the on/off of the CMOS switch, thus controlling the on or off of the power supply circuit. For example, when a signal is applied to the gate electrode, the CMOS switch may be turned on so that current may flow through the MOSFETs. When the signal is not applied to the gate electrode, the CMOS switch may be turned off so that current stops flowing through the MOSFETs.

In some embodiments, the starter circuit according to the present disclosure may optionally use a microphone switch ("MIC switch"). The MIC switch may include a pressure sensor or an airflow sensor. An example of the sensor compatible with the MIC switch according to the current disclosure is a LPS22HB MEMS pressure sensor designed by STMicroelectronics. The MIC switch may be used to detect the inhaling by a user of the EVD. The MIC switch may have at least two states—an ON state and an OFF state. When the MIC switch in an OFF state, the starter circuit cannot turn on the power supply circuit regardless whether a signal is applied to the CMOS switch or not. When the MIC switch is in an ON state, the starter circuit may turn on the power supply circuit when a signal is also applied to the CMOS switch. In some embodiments, one or more of pressure sensors and/or airflow sensors in the MIC switch may provide rapid responses to a certain level of airflow (e.g., a level corresponding to the airflow inhaled by an adult while puffing the EVD using his normal strength), thus turning on the MIC switch. Therefore, as an example, the EVD may start operation when a user touches the contact points while also puffing the EVD.

In some embodiments, the starter circuit may further optionally include a short-circuit protection circuit. Short circuit occurs when the electrical impedance in the circuit is very low or close to zero, which results in an excessive amount of current flowing in the circuit. The starter circuit may automatically cause an open circuit when it detects the amount of current in the circuit is above the normal operation current or close to the maximum operation current of the circuit, which is typically in the range of 0.1 A-60 A. For example, when the detected current is more than 80% of the maximum operation current, the starter circuit may cause an open circuit and cut off the current flow. Therefore, a short-circuit protection circuit adds another layer of safety to the EVD.

Consistent with some embodiments according to the present disclosure, the EVD may include a power supply circuit. The power supply circuit may be any kind of power circuit that can provide a certain level of voltage across a load that draws electric current (e.g., heater 110). In other words, the power supply circuit electrically couples the power source with the load. In some embodiments, the power source of the power circuit may be a battery. In some other embodiments, the power source of the power circuit may come from port 132 using a USB port, a mini-USB port, a micro-USB port, a USB-C port, or other types of suitable ports that provide power to the power supply circuit for supplying power to heater 110.

Consistent with some embodiments according to the present disclosure, the EVD may optionally include an adjustable timer switch for switching off the electric power supply after a certain continuous duration of lighting up the EVD. This will reduce the risk of overheating the vaporizable material or other components within the EVD that may lead to inflammation. For example, the duration may be pre-set at a maximum of 10 seconds so that the EVD will continuously work for up to 10 seconds after physically connecting the contact points with an object having resistance with a predetermined range. Upon reaching the maximum continuous duration, the operation of the EVD will be terminated by cutting off the electric power. In another example, the EVD will continuously vaporize the vaporizable material for another 10 seconds after the contact points are disconnected from the object while the user keeps puffing the EVD. In some other embodiments, the duration of the continuous heating may be adjusted by a user of the EVD according to his or her preference. For example, the user may set the duration to be no longer than a predetermined time length (e.g., 10 seconds) and adjust the duration to be, for example, 1 second, 2 seconds, 3 seconds, 5 seconds, 7 seconds, or 9 seconds. In some other embodiments, with the teaching of the present disclosure, a person of ordinary skill in the art would know how to pre-set the duration to be more than 10 seconds according to different needs.

In some embodiments, the EVD may optionally include an overall switch. When the overall switch is on, the EVD may perform the above functions. Otherwise, if the overall switch is off, the EVD may not be activated to perform any of the above functions. The overall switch may be a press button, a push button, or an up-down switch on the outside surface of the EVD. In other embodiments, the overall switch may use a piezoelectric sensor, so that the switch may be turned on or off by a pressing force beyond a predetermined level (e.g., a level equaling to a gentle touch by an adult).

FIG. 1 illustrates a schematic diagram of an exemplary EVD 100, consistent with some disclosed embodiments. Although the following description uses a pod system as an implementation of the present disclosure, it is noted that this is just one example and a person of ordinary skill in the art would know, with the teaching of the present disclosure, that the same disclosure can be implemented on other types of EVD while achieving the same purpose of the present disclosure.

EVD 100, as shown in FIG. 1, may include a heater 110, a compartment 120, and a power source 130. Power source 130 may include one or more batteries that power EVD 100 through a control circuit 140. The battery may be an alkaline battery, a lithium-ion battery, or any other type of battery that is able to provide operation voltage of the EVD, commonly in the range of 0.1V-15V. The battery may be a primary battery that is not rechargeable or a secondary battery that is rechargeable. Primary batteries use materials whose chemical reactions are not easily reversible. They are superior than secondary batteries (a.k.a. rechargeable batteries) in terms of energy densities and initial purchase cost. On the other hand, secondary batteries are more economic in the long run as the batteries are reusable after each recharge.

Consistent with some embodiments of the present disclosure, power source 130 may include a secondary lithium-ion battery housed in a battery compartment 131. It is noted that the number and the type of batteries are not limited to these embodiments.

Power source 130 may use a secondary battery that is rechargeable outside of battery compartment 131 by a battery charger (not shown). This may be done by removing the battery from a cover (not shown) near the bottom of EVD 100. Alternatively, the battery may be recharged through a recharging circuit (not shown) within EVD 100, which can be plugged into an external power source via port 132 on the outer surface of EVD 100. Port 132 may be a USB port, a mini-USB port, a micro-USB port, a USB-C port, or other types of suitable ports that provide power to the recharging circuit for the purpose of recharging power source 130. In some embodiments, port 132 may be provided on the other part of the outer surface of EVD 100, not just the location shown in FIG. 1.

According to the present disclosure, control circuit 140 may include a detection circuit, a starter circuit, and a power circuit. In some embodiments, control circuit 140 may optionally include an amplifier circuit. In some other embodiments, the starter circuit may optionally include a MIC switch. A MIC switch may be a regular MIC switch, a condenser MIC switch, a MIC switch with a control panel, or any suitable type of MIC switch.

Consistent with some embodiments according to the present disclosure, the detection circuit may detect the physical connection between an object having a resistance within a predetermined range and two or more contact points disposed on the outside surface of the EVD. In some embodiments, the two or more contact points may include a metal contact point, an alloy contact point, a contact point of any material that can be used for detecting an object having a resistance within the predetermined range, or a contact point using a combination of these materials. When the two or more contact points are physically connected to the object, a circuit path may be formed. Thus, a predetermined range of current flowing in the circuit path may be detected by the detection circuit. The range of current may correspond to a range of resistance of the object, for example, from 0Ω to 1 MΩ. Therefore, once the operation voltage of the detection circuit is known, the range of current detectable by the detection circuit may determine the range of resistance of an object that may trigger the provision of electric power to heater 110.

In some embodiments, heater 110 may be a resistive element which generates heat when current passes through. The resistance of heater 110 may typically be within a range of 0.01Ω to 10Ω. That said, the heater type is not limited to a resistive heating element. So long as it can convert electric power to thermal power, other types of heater may be used in an EVD consistent with the current disclosure. For example, heater 110 may also include a metal body and a conductive coil (e.g. copper) capable of heating by magnetic induction when an alternate electric (AC) current passes through the coil and induces an electrical current in a metal body of the heater. The conductive coil may surround at least a part of the body of the heater.

In some embodiments consistent with the current disclosure, electric power may be transferred through power source 130 to heating element 111 of heater 110 via contacting electrodes (not shown). One of the electrodes may be a pair of electrode tabs attached to or embedded in battery compartment 131, and the other electrode may be a pair of electrode tabs attached to or embedded in the bottom portion of heater 110. When electrodes contacts with each other, a circuit for providing heat-generating current to the resistive heating element is formed.

In some embodiments, heater 110 according to the current disclosure may have a hollow structure and thus serve two functions. The first function is to heat a vaporizable material stored in compartment 120 to create an aerosol, and the second is to provide an airflow path for the aerosol to be vented outside the heater through an outlet of heater 110. The airflow path is partially formed by a chamber defined by a sidewall and at least one opening on the sidewall of heater 110 (not shown).

Figure 2A:
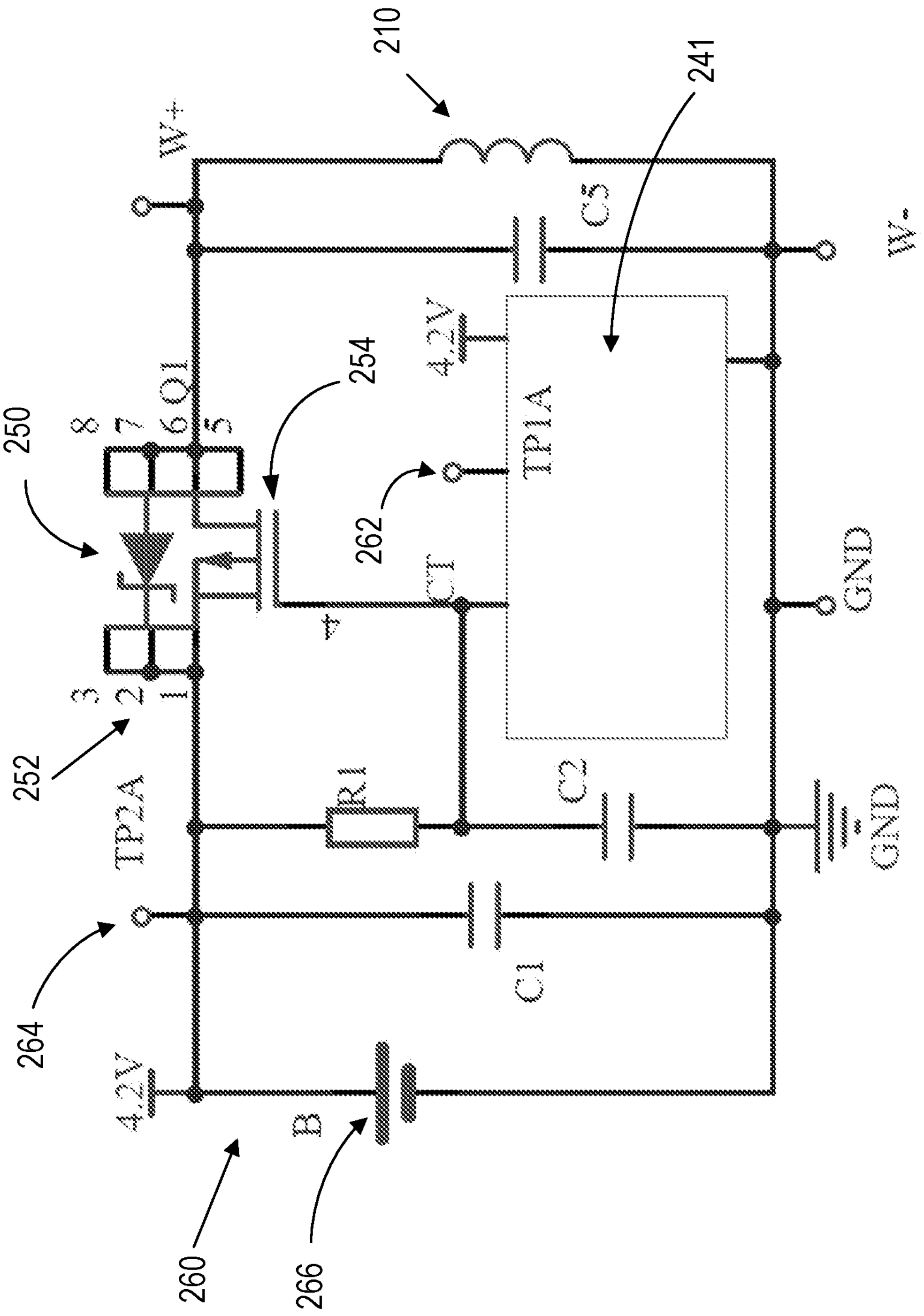
FIG. 2A illustrates a circuit diagram of an exemplary system for providing electric power to a heater of an EVD, consistent with some disclosed embodiments.
Figure 2B:
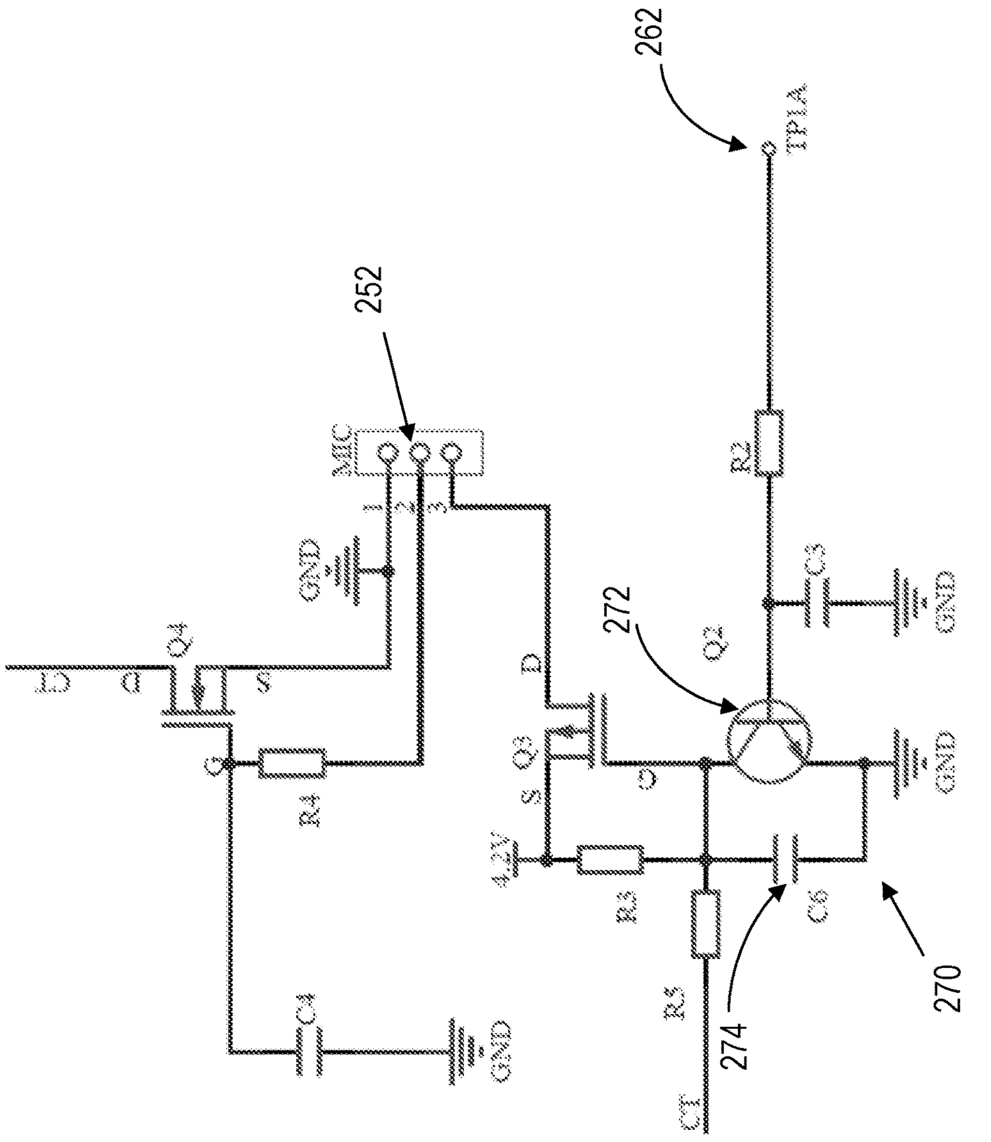
FIG. 2B illustrates a circuit diagram of an exemplary signal processing and control circuit of the exemplary system in FIG. 2A, consistent with some disclosed embodiments.

FIG. 2A illustrates a circuit diagram of an exemplary system for providing electric power to a heater of an EVD and FIG. 2B illustrates a circuit diagram of an exemplary signal processing and control circuit of the exemplary system in FIG. 2A, consistent with some embodiments of the current disclosure. System 200 in FIG. 2A may be compatible with the embodiments discussed above in conjunction with FIG. 1. As illustrated in FIG. 2A, system 200 may include a starter circuit 250, a detection circuit between a first contact point 262 (TP1A) and a second contact point 264 (TP2A), and a power circuit 260 that further includes a power source 266. System 200 may further include a signal processing and control circuit 241. In some embodiments, as illustrated in FIG. 2B, signal processing and control circuit 241 may include an amplifier circuit 270. It is understood that amplifier circuit 270 is optional and may not be provided in some embodiments according to the current disclosure.

Consistent with some embodiments according to the present disclosure, the detection circuit may include first contact point 262 and second contact point 264. When connected by an object having a resistance within a predetermined range, first contact point 262 and second contact point 264 may form a circuit path. In some embodiments, the predetermined resistance range may correspond to a minimum resistance and a maximum resistance of a targeted part of a human body. For example, the targeted part of the human body may be the part between two fingers of a same hand. In another example, it may be the part between one finger and the mouth. In yet another example, the predetermined resistance range may correspond to two fingers of a same hand that wears a glove. If the detection circuit determines that the resistance of the object connecting first contact point 262 and second contact point 264 is within the predetermined range, it may send a signal to starter circuit 250 via its CT line, as shown in FIGS. 2A and 2B.

Consistent with some embodiments according to the present disclosure, starter circuit 250 may include a CMOS switch 254. When the signal from the detection circuit is applied to the gate electrode of CMOS switch 254 (indicated by number 4), CMOS switch 254 may be turned on to allow electric power to be supplied in a power supply circuit 260 from a power source 266 to a resistive element 210.

In some embodiments, starter circuit 250 may optionally include a MIC switch 252. MIC switch 252 may serve as an added layer of safety in that the provision of electric power to resistive element 210 requires both CMOS 254 and MIC switch 252 to be turned on. In some embodiments, MIC switch 252 may be used to detect the inhaling of an airflow by a user of the EVD through a mouthpiece of the EVD (e.g., mouthpiece 121 shown in FIG. 1). MIC switch 252 may include a pressure sensor or an airflow sensor. When the sensor of MIC switch 252 detects a certain level of airflow (e.g., a level corresponds to the airflow inhaled by an adult while puffing the EVD using his normal strength), port 1 and port 3 of MIC switch 252 may be connected. This state of MIC switch 252 may be designated as the first state—ON state. Under this first state, port 1 and port 3 may form a circuit path and allow power circuit 260 to provide power to resistive element 210, which converts electric power to thermal power. When no airflow within a certain range is detected, port 1 and port 2 of MIC switch 252 may be connected. This state of MIC switch 252 may be designated as the second state—OFF state. Under this second state, power circuit 260 may be cut off and no electricity may be provided to resistive element 210, no matter whether the detection circuit detects a physical connection between an object having a resistance within a predetermined range and contact points 262 and 264.

In some embodiments, as shown in FIG. 2B, signal processing and control circuit 241 may optionally include amplifier circuit 270. Amplifier circuit 270 may include a transistor 272 and a capacitance 274. In some embodiments, when the output signal from the detection circuit is too small to turn on starter circuit 250, amplifier circuit 270 may use electric power from power source 266 to increase the amplitude of the output signal applied to its input terminals and produce a proportionally greater amplitude signal or a constant signal at its output terminal. The amplified signal may be provided to starter circuit 250, so that power supply circuit 260 may be turned on by starter circuit 250 and cause the electric power to be provided to resistive element 210.

Consistent with some embodiments according to the present disclosure, as shown in FIG. 2A, power circuit 260 may include power source 266, CMOS 254, and resistive element 210. In some embodiments, when the detection circuit determines that the resistance of the object connecting first contact point 262 and second contact point 264 is within the predetermined range, starter circuit 250 may turn on CMOS 254, thus allowing electric power from power source 266 to pass through CMOS 254 and to be converted to thermal power at resistive element 210. In other embodiments where MIC switch is provided, when MIC switch 252 detects a certain level of airflow (e.g., a level corresponds to the airflow inhaled by an adult while puffing the EVD using his normal strength) and when the detection circuit determines that the resistance of the object connecting first contact point 262 and second contact point 264 is within the predetermined range, starter circuit 250 may turn on CMOS 254 and MIC switch 252, so power source 266 may provide electric power to resistive element 210. Resistive element 210 may function as a heater in the EVD that starts to convert electric power to thermal power, thus vaporizing the vaporizable material housed in the compartment of the EVD.

In some embodiments, power source 266 may include one or more batteries housed in a battery compartment of the EVD. For example, power supply 262 may include an alkaline battery, a lithium-ion battery, or any other type of battery that is able to provide operation voltage of the EVD, commonly in the range of 0.1V-15V. In some other embodiments, power supply 262 may be an external power source (e.g., a portable battery) connected to the EVD via a power port on the outer surface of the EVD. Port 134 may be a USB port, a mini-USB port, a micro-USB port, a USB-C port, or other types of suitable ports that provide electricity power to power circuit 260.

In some embodiments, system 200 may optionally include an adjustable timer switch (not shown) for switching off the electric power supply after a certain continuous duration of lighting up the EVD. For example, the duration may be pre-set at a maximum of 10 seconds so that electric power from power source 266 will be continuously provided to resistive element 210 for up to 10 seconds after physically connecting the contact points 262 and 264 with an object having resistance with a predetermined range. Upon reaching the maximum continuous duration, the electric power from power source 266 will be cut off. In another example, the EVD will continuously vaporize the vaporizable material for another 10 seconds after the connection points 262 and 264 are disconnected from the object while the user keeps puffing the EVD.

In some other embodiments, the duration of the continuous heating may be adjusted by a user of the EVD according to his or her preference. For example, the adjustable timer switch may include a programable circuit and a user interface (e.g., a touch screen or one or more press buttons) for setting the duration. The user may set the duration to be no longer than a predetermined time length (e.g., 10 seconds) and adjust the duration to be, for example, 1 second, 2 seconds, 3 seconds, 5 seconds, 7 seconds, or 9 seconds. In some other embodiments, with the teaching of the present disclosure, a person of ordinary skill in the art would know how to pre-set the duration to be more than 10 seconds according to different needs.

In some embodiments, system 200 may optionally include an overall switch (not shown) so that when the overall switch is turned on, system 200 may perform the various functions described in the present disclosure. Otherwise, when the overall switch is turned off, the power supply is cut off from system 200 and no electricity may be further provided via power circuit 260.

Figure 3A:
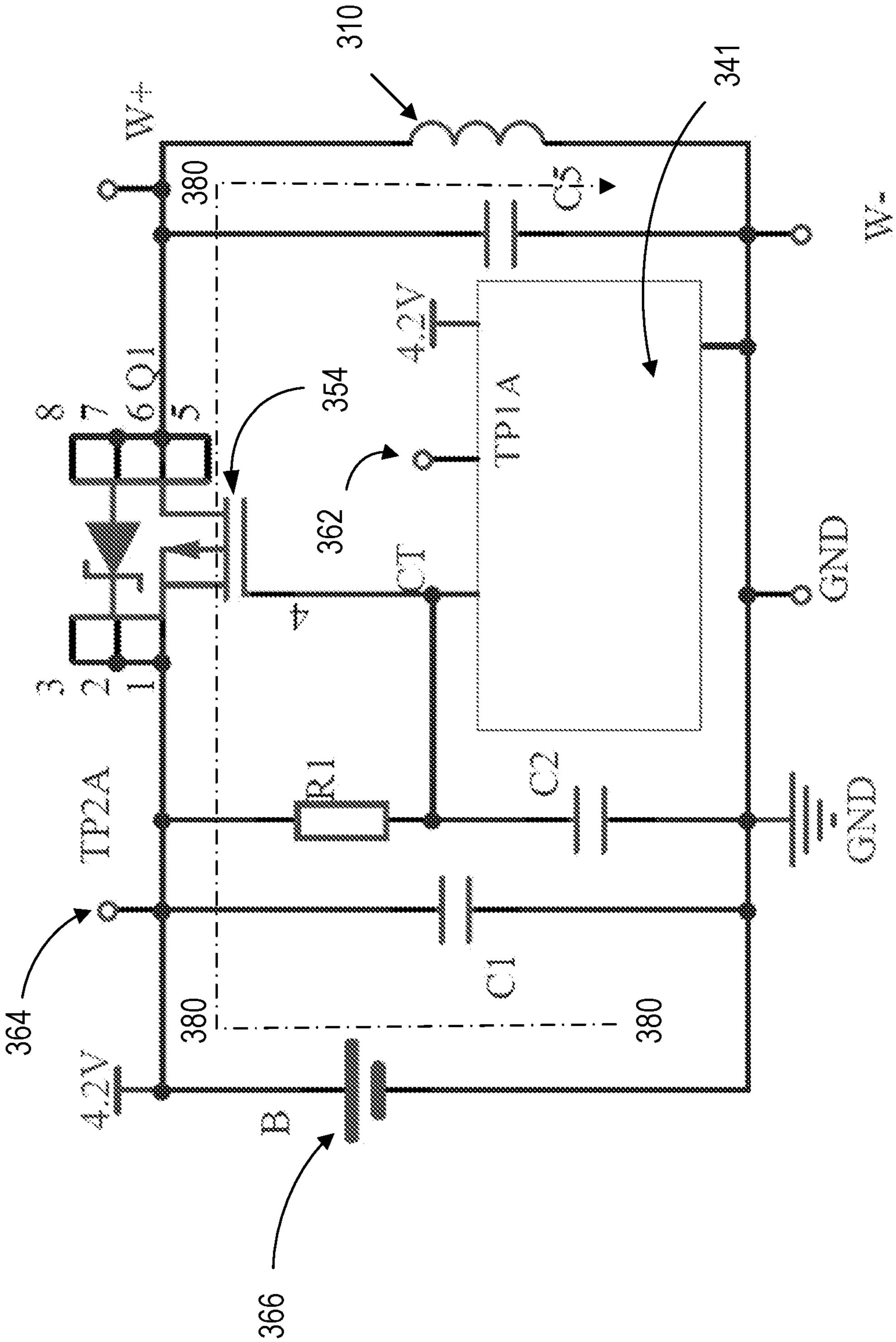
FIGS. 3A-3B illustrate circuit diagrams of an exemplary system for providing electric power to a heater of an EVD when the EVD is activated, consistent with some disclosed embodiments.
Figure 3B:
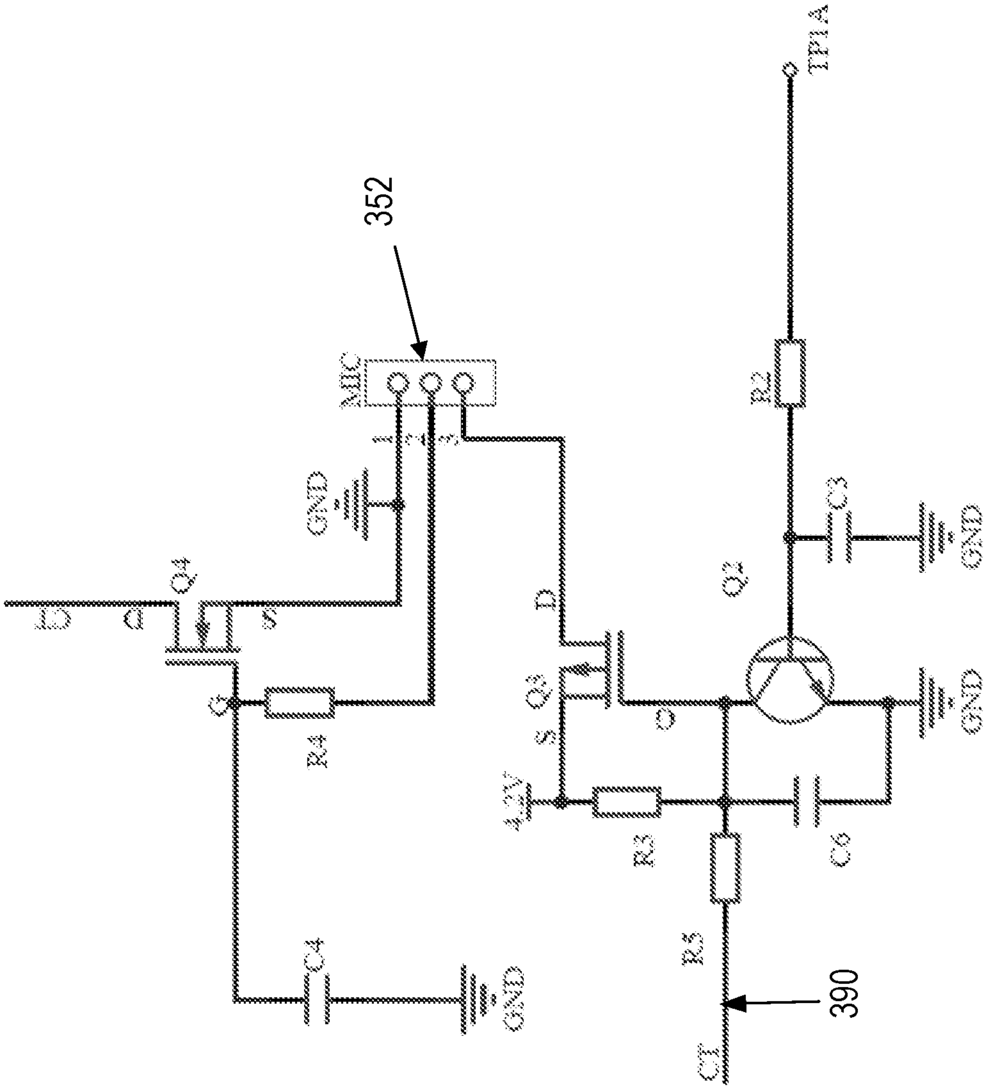

FIGS. 3A-3B illustrate circuit diagrams of an exemplary system for providing electric power to a heater of an EVD when the EVD is activated, consistent with some disclosed embodiments of the current disclosure. In some embodiments, when first contact point 362 and second contact point 364 are connected by an object having a resistance within a predetermined range (e.g., from 0Ω to 1 MΩ), a signal is sent from a signal processing and control circuit 341 to the gate electrode of a CMOS 354, thus allowing electric current to pass through an electric path 380 along the dotted line in FIG. 3A from a power source 366, to CMOS 354, and to a resistive element 310. The object making contact with contact points 362 and 364 may be two fingers of a same hand, a mouth and a finger, upper and lower lips, or any other two parts of a human body. Power source 366 may also supply electric power to a MIC switch 352 shown in FIG. 3B. When the user inhales from the mouthpiece of the EVD, one or more airflow sensors of MIC switch 352 detect an airflow and thus MIC switch 352 turns to a first state (where, for example, port 1 and port 3 are connected). When MIC switch 352 is in the first state and CMOS 354 is also turned on by the signal sent to its gate electrode, electric power may be provided to resistive element 310 via electric path 380.

In some other embodiments where reduced cost is desired, system 200 may not include MIC switch 352. When first contact point 362 and second contact point 364 are connected by the object having a resistance within the predetermined range, electric current passes through an electric path 390, as shown in FIG. 3B, and further passes through resistance R5, so that a signal may be sent to the gate electrode of CMOS 354 in FIG. 3A. Thus, as soon as CMOS 354 is turned on, power source 366 may provide electric power to resistive element 310. Resistive element 310 may function as a heater in the EVD that starts to convert electric power to thermal power, thus vaporizing the vaporizable material housed in the compartment of the EVD.

FIGS. 4A-4D illustrate schematics of positions of the contact points in an EVD, consistent with some disclosed embodiments of the current disclosure. In some embodiments, the EVD may be an integrated-bodied POD system 402, a separate-bodied POD system 404, a large separate-bodied vaporizer 406, or an atomizer 408.

In some embodiments according to the present disclosure, the EVD may be integrated-bodied POD system 402. As illustrated in exemplary EVDs 401, 403, and 405 in FIG. 4A, the two or more contact points may be disposed on both ends of the outer body 468 of EVD 401, along two sides of the wide body 468 of EVD 403, or along two sides of the narrow body 468 of EVD 405. Using EVD 401 as an example, when first contact point 462 and second contact point 464 are connected by an object having a resistance within a predetermined range, a circuit path may be formed between two contact points 462 and 464, thus generating an electric signal to be detected by a detection circuit. An amplifier circuit may amplify the detected electric signal to activate a power circuit via a starter circuit, thus allowing a power source to provide electric power to a heater of EVD 401. Integrated-bodied POD system 402 according to the present disclosure may greatly reduce the risk of overheating or fire caused by inadvertently turning on the heater. The heater of integrated-bodied POD system 402 can only be turned on when an object having a resistance with a predetermined range, such as a mouth and a finger of a human body, is physically connected to two or more contact points.

Figure 4A:
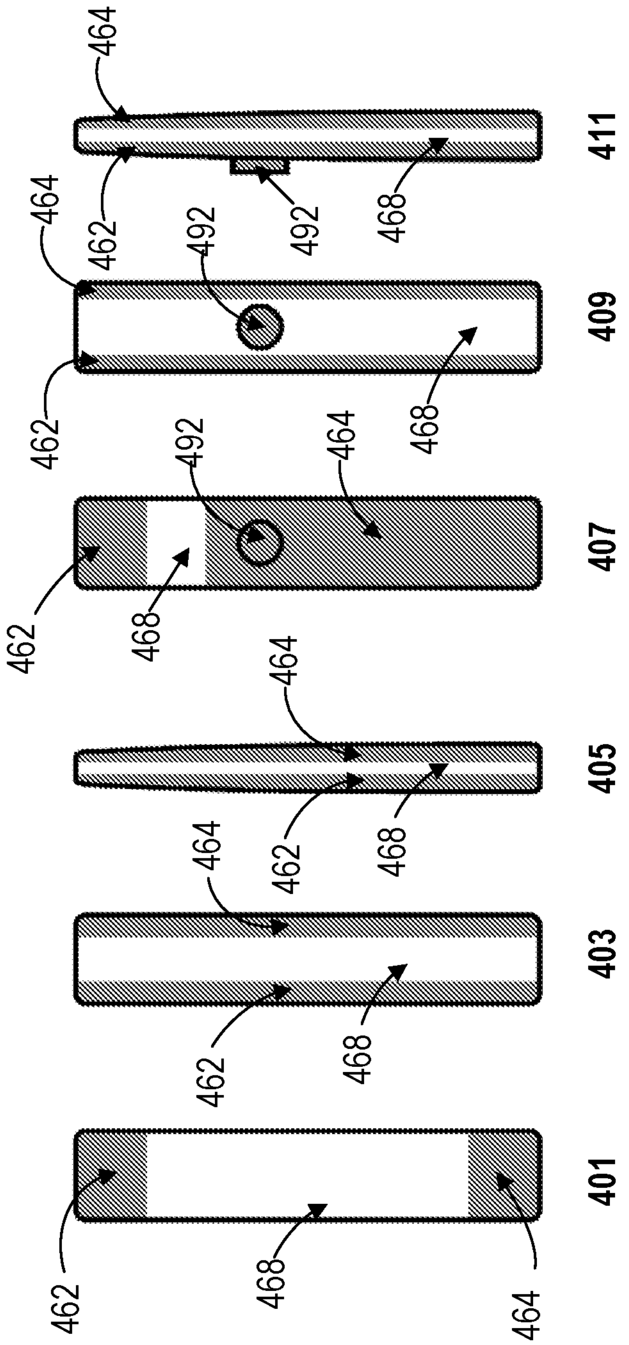
FIGS. 4A-4D illustrate schematics of positions of the contact points in an EVD, consistent with some disclosed embodiments.

In some embodiments, integrated-bodied POD system 402 may further include a MIC switch (not shown in FIG. 4A). The MIC switch may include a pressure sensor or an airflow sensor to detect the inhaling by a user of the EVD through a mouthpiece of the EVD. Integrated-bodied POD system 402 according to these embodiments may only be turned on when an object having a resistance with a predetermined range, such as a mouth and a finger of a human body, is physically connected to two or more contact points and MIC switch simultaneously senses a certain level of airflow (e.g., a level corresponding to the airflow inhaled by an adult while puffing the EVD using his normal strength). This configuration of an added MIC switch makes the EVD even safer to use as the operation of the heater requires two conditions to be satisfied.

In some further embodiments, integrated-bodied POD system 402 may have an overall switch 492 disposed on the outer body 468 of the EVD. In some embodiments, overall switch 492 may control the on/off of the power circuit and may be independent from the detection circuit or the MIC switch, if any. In some other embodiments, overall switch 492 may override the detection circuit or MIC switch, if any, and turn off the heater. Overall switch 492 may be a press button, a push button, an up-down switch, or any other configuration as long as the function of the overall switch can be achieved. For example, the overall switch may use a piezoelectric sensor, so that the switch may be turned on or off by a pressing force beyond a certain level. As illustrated in exemplary EVDs 407, 409, and 411 in FIG. 4A, the two or more contact points may be disposed on both ends of the outer body 468 of EVD 407, along two sides of the wide body 468 of EVD 409, or along two sides of the narrow body 468 of EVD 411. Overall switch 492 may be configured at contact point 464 of EVD 407, at outer body 468 of EVD 409, or at contact point 462 of EVD 411. The addition of an overall switch makes it easier to control the operation of the EVD.

In some embodiments according to the present disclosure, the EVD may be separate-bodied POD system 404. Separate-bodied POD system 404 may include a pod 494 that contains a vaporizable material and a base 496 that contains a power source. Pod 494 and base 496 may be separated from each other, so that pod 494 may be replaced with other pods containing different vaporizable materials (e.g., different flavorings). As illustrated in exemplary EVDs 413, 415, 417, 419, 421, 423, and 425 in FIG. 4B, the two or more contact points may be disposed on both ends of base 496 of EVD 413, along two sides of the wide body of base 496 of EVD 415, along two sides of the narrow body of base 496 of EVD 417, on both ends of pod 494 of EVD 419, along two sides of the wide body of pod 494 of EVD 421, along two sides of the narrow body of pod 494 of EVD 423, or respectively on pod 494 and base 496 of EVD 425, respectively. Using EVD 425 as an example, when the user touches first contact point 462 by mouth and second contact point 464 by hand, a circuit path may be formed between two contact points 462 and 464, thus generating an electric signal to be detected by a detection circuit. An amplifier circuit may amplify the detected electric signal to activate a power circuit via a starter circuit, thus allowing a power source to provide electric power to a heater of EVD 425. Separate-bodied POD system 404 according to the present disclosure may greatly reduce the risk of overheating or fire caused by inadvertently turning on the heater. The heater of separate-bodied POD system 404 can only be turned on when an object having a resistance with a predetermined range, such as a mouth and a hand of a human body, is physically connected to two or more contact points.

Figure 4B:
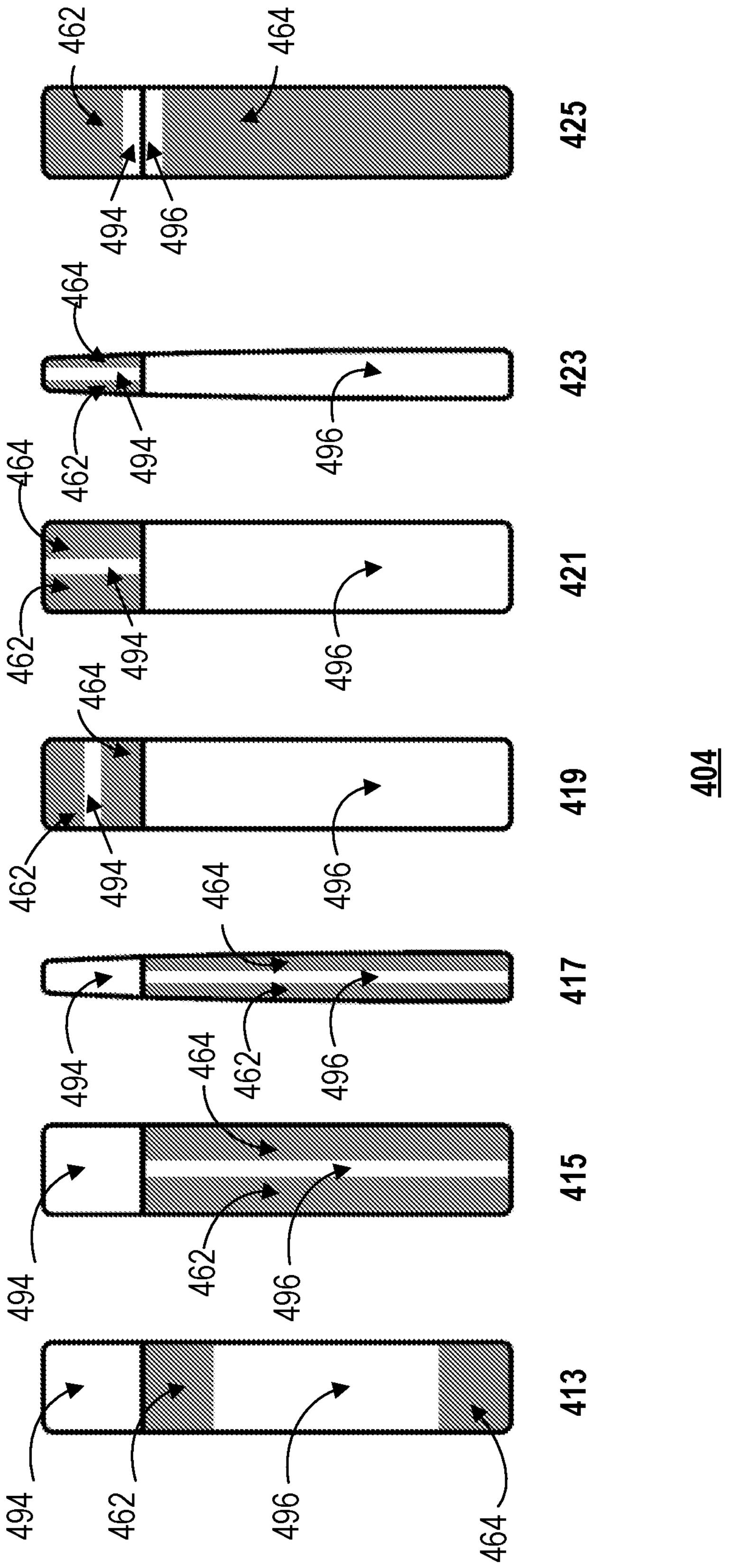
Figure 4C:
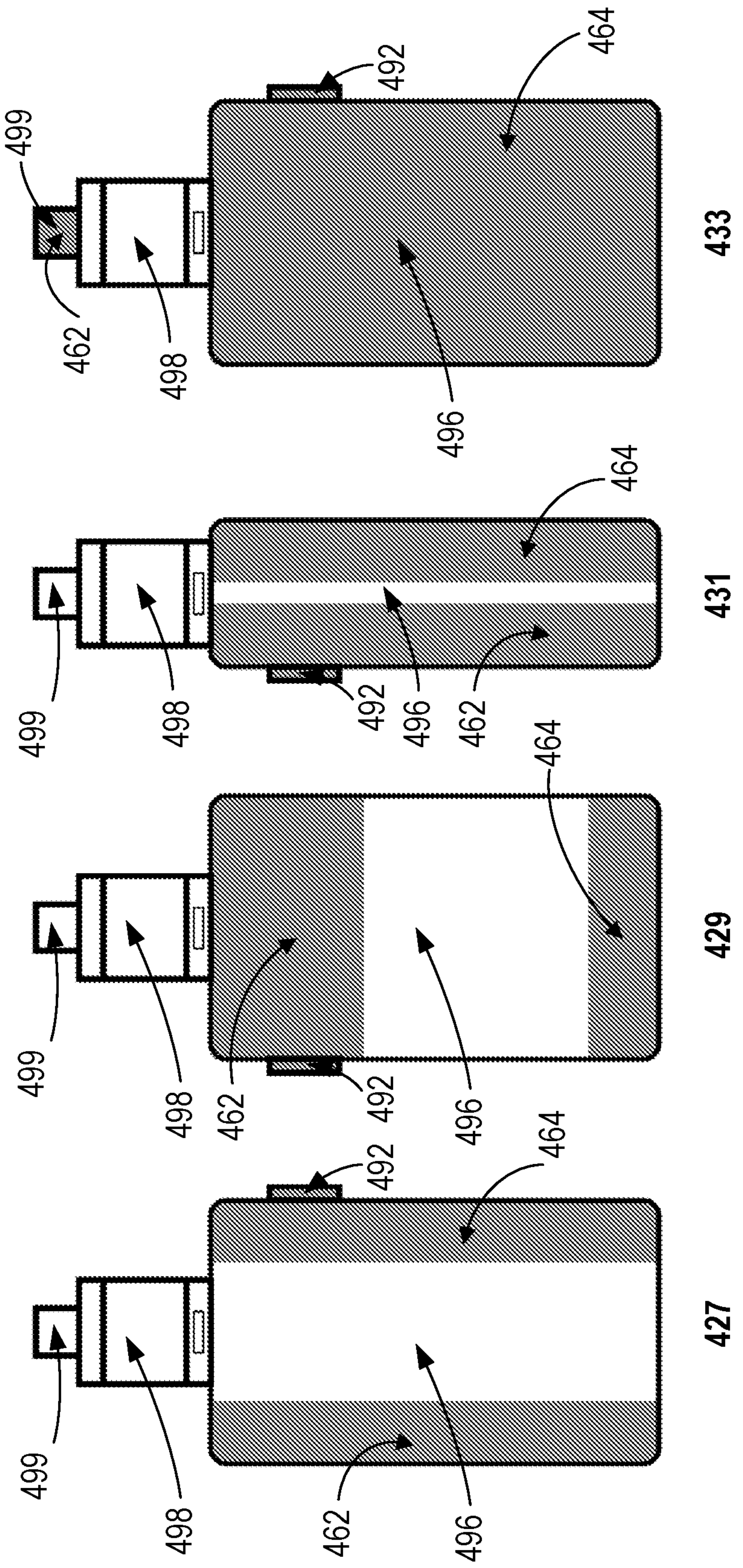

Although not shown in FIG. 4B, separate-bodied POD system 404 according to the present disclosure may further include a MIC switch and/or an overall switch. The configurations and advantages of an added MIC switch and/or an added overall switch are the same as those discussed in conjunction with the embodiments in FIG. 4A, which will not be repeated here.

In some embodiments according to the present disclosure, the EVD may be large separate-bodied vaporizer 406. Large separate-bodied vaporizer 406 may include a cartridge 498 that contains a vaporizable material and a base 496 that contains a power source. Cartridge 498 may further include a mouthpiece 499 at its top end. Cartridge 498 and base 496 may be separated from each other, so that cartridge 498 may be replaced with other cartridges containing different vaporizable materials (e.g., different flavorings) or different configurations of wick or heater. As illustrated in exemplary EVDs 427, 429, 431, and 433 in FIG. 4C, the two or more contact points may be disposed along two sides of the wide body of base 496 of EVD 427, on both ends of base 496 of EVD 429, along two sides the narrow body of base 496 of EVD 431, or respectively on cartridge 498 (e.g., at mouthpiece 499) and base 496 of EVD 433. Using EVD 433 as an example, when the user touches first contact point 462 by mouth and second contact point 464 by hand, a circuit path may be formed between two contact points 462 and 464, thus generating an electric signal to be detected by a detection circuit. An amplifier circuit may amplify the detected electric signal to activate a power circuit via a starter circuit, thus allowing a power source to provide electric power to a heater of EVD 433. Large separate-bodied vaporizer 406 according to the present disclosure may greatly reduce the risk of overheating or fire caused by inadvertently turning on the heater. The heater of large separate-bodied vaporizer 406 can only be turned on when an object having a resistance with a predetermined range, such as a mouth and a finger of a human body, is physically connected to two or more contact points.

In some further embodiments, large separate-bodied vaporizer 406 may have an overall switch 492 disposed on the outer surface of base 496 of the EVD. Although not shown in FIG. 4C, large separate-bodied vaporizer 406 according to the present disclosure may further include a MIC switch. The configurations and advantages of an added MIC switch and/or an added overall switch are the same as those discussed in conjunction with the embodiments in FIG. 4A, which will not be repeated here.

In some embodiments, the EVD may be atomizer 408. Atomizer 408 may include a mouthpiece 499 at its top end. As illustrated in exemplary EVDs 435 and 437 in FIG. 4D, the two or more contact points may be disposed on both ends of mouthpiece 499 of EVD 435, or along two sides of mouthpiece 499 of EVD 437. Using EVD 437 as an example, when the upper and lower lips of the user touch first contact point 462 and second contact point 464 respectively, a circuit path may be formed between two contact points 462 and 464, thus generating an electric signal to be detected by a detection circuit. An amplifier circuit may amplify the detected electric signal to activate a power circuit via a starter circuit, thus allowing a power source to provide electric power to a heater of EVD 437. Atomizer 408 according to the present disclosure may greatly reduce the risk of overheating or fire caused by inadvertently turning on the heater. The heater of atomizer 408 can only be turned on when an object having a resistance with a predetermined range, such as a mouth and a finger of a human body, is physically connected to two or more contact points.

Figure 4D:
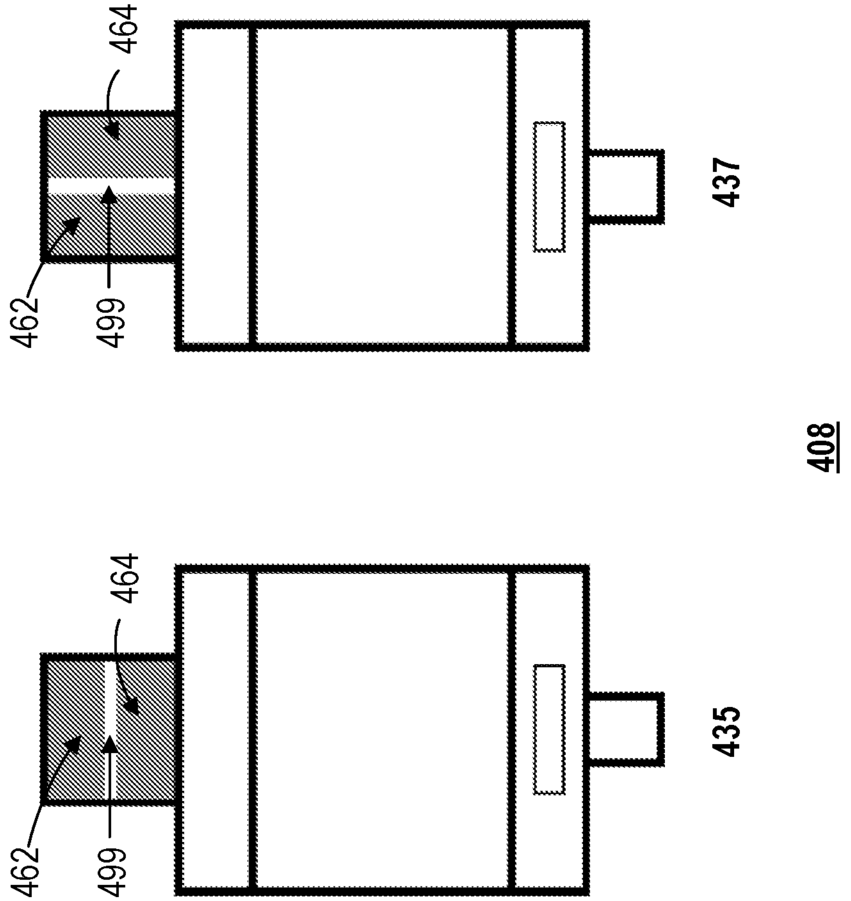

Although not shown in FIG. 4D, atomizer 408 according to the present disclosure may further include a MIC switch and/or an overall switch. The configurations and advantages of an added MIC switch and/or an added overall switch are the same as those discussed in conjunction with the embodiments in FIG. 4A, which will not be repeated here.

It is to be contemplated that the position of all contact points, including those depicted in FIGS. 4A-4D, are interchangeable and the number of contact points within each EVD are not limited to two as currently illustrated in the disclosed embodiments.

Figure 5:
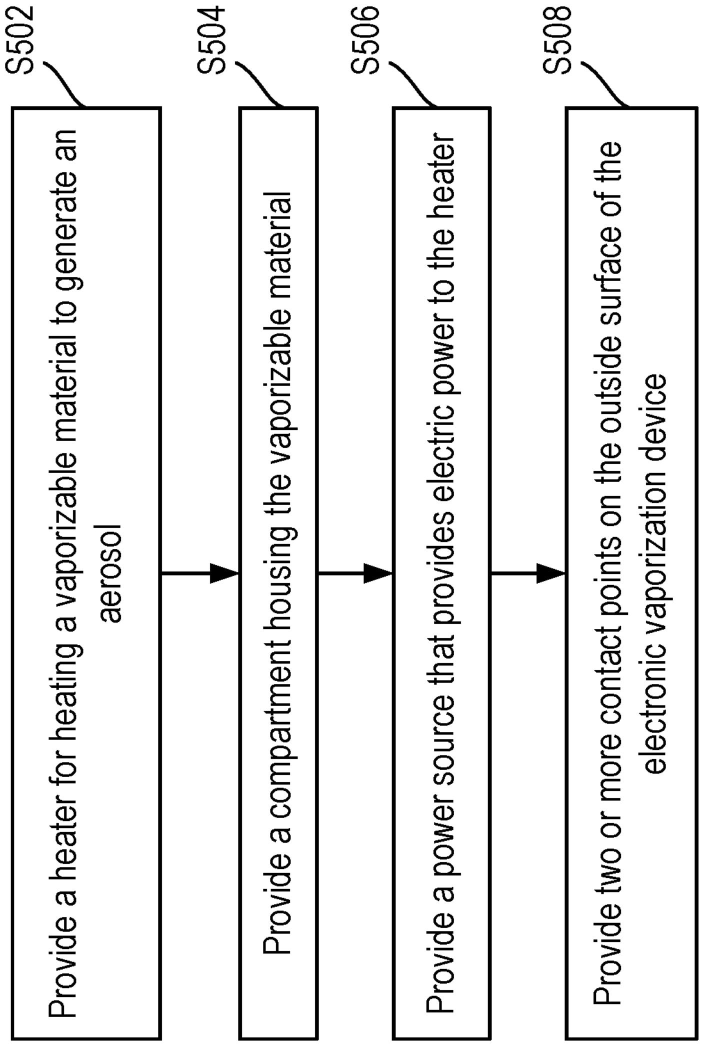
FIG. 5 illustrates a flowchart of an exemplary method for generating an aerosol with an electronic vaporization device, consistent with some disclosed embodiments.

FIG. 5 illustrates a flowchart of an exemplary method 500 for generating an aerosol with an EVD, consistent with some disclosed embodiments of the current disclosure. In step S502, a heater may be provided for heating a vaporizable material to generate an aerosol. In some embodiments, the heater may be a resistive element which generates heat when current passes through. The resistance of the heater typically may be within a range of 0.01Ω to 10Ω. That said, the heater type is not limited to a resistive heating element. So long as it can convert electric power to thermal power, other types of heater may be used. For example, the heater may also include a metal body and a conductive coil (e.g. copper) capable of heating by magnetic induction when an alternate electric (AC) current passes through the coil and induces an electrical current in a metal body of the heater. The conductive coil may surround at least a part of the body of the heater. The heater may be disposed in proximity with the vaporizable material in a compartment, so that an aerosol may be generated from the vaporizable material when the heater raises temperature to a range of, for example, 100-280° C. The aerosol so generated, also called vapor, may contain a suspension of fine solid particles or liquid droplets for the user to inhale.

In step S504, a compartment that houses the vaporizable material may be provided. The compartment may be disposed in a cartridge. The vaporizable material may include two or more of propylene glycol (PG), vegetable glycerin (VG), or flavorings. In some embodiments, the compartment may be thermally connected to the heater so that the vaporizable material housed therein may be vaporized to create an aerosol. For the purpose of this disclosure, "thermally connect(ed/s)" or "thermal connection" means that there is a flow of thermal energy between two or more components when they are connected by a path permeable to heat.

In step S506, a power source may be provided that provides electric power to the heater. In some embodiments, the power source may be an alkaline battery, a lithium-ion battery, or any other type of battery that is able to provide operation voltage of the EVD, commonly in the range of 0.1V-15V. In some other embodiments, the power source may be an external power source coupled to the heater via a port. The port may be a USB port, a mini-USB port, a micro-USB port, a USB-C port, or other types of suitable ports that provide electricity power to the heater.

In step S508, two or more contact points may be provided on the outside surface of the EVD. In some embodiments, the two or more contact points may include a metal contact point, an alloy contact point, a contact point of any material that can be used for detecting an object having a resistance within a predetermined range, or a contact point using a combination of these materials.

When the two or more contact points are physically connected to an object, a circuit path may be formed. Depending on the value of resistance, the current flowing in the circuit path may vary. A detection circuit may be provided to sense a predetermined range of current that passes through the circuit path, thus causing electric power to be provided from a power source to a heater. The range of current may correspond to a range of resistance of the object, for example, from 0Ω to 1 MΩ. If the current drops below or exceeds the predetermined range, no electric power is provided. In some embodiments, the predetermined resistance range may correspond a minimum resistance and a maximum resistance of a targeted part of a human body. For example, the targeted part of the human body may be the part between two fingers of a same hand. In another example, it may be the part between one finger and the mouth. In yet another example, the predetermined resistance range may correspond to two fingers of a same hand that wears a glove. The resistance of a human body normally ranges from 500Ω to 100,000Ω.

For an EVD according to the current disclosure to be activated, since two or more contact points need to be connected by an object having a resistance within a certain range, the inadvertent activation rate may be significantly reduced. For example, if one of the contact points is accidentally touched and/or pressed, because the other contact point is not touched and/or pressed, the EVD will not be activated. Even if both contact points are touched and/or pressed by an unintended object (e.g., clothes, bags, etc.), the detection circuit may detect that the resistance is not within the predetermined range and thus the EVD will not be activated. By reducing the inadvertent activation rate of the EVD, the safety of using the EVD may be further improved.

It will be apparent to those skilled in the art that various modifications and variations can be made to the disclosed devices and related apparatuses. Other embodiments will be apparent to those skilled in the art from consideration of the specification and practice of the disclosed devices and related apparatuses.

It is intended that the specification and examples be considered as exemplary only, with a true scope being indicated by the following claims and their equivalents.

What is claimed is:

1. An electronic vaporization device, comprising:

a heater for heating a vaporizable material;

a compartment housing the vaporizable material, said compartment being thermally connected to the heater;

a power source providing electric power to the heater, said electric power being converted to thermal power;

two or more contact points disposed on an outside surface of an outer body of the electronic vaporization device; and a first switch having at least a first state and a second state, wherein the first switch is configured to detect an airflow through a mouthpiece of the electronic vaporization device and switch between the first state and the second state in response to a level of the airflow detected, and wherein the electric power is provided when the two or more contact points are physically connected to an object having a resistance within a predetermined range and the first switch is in the first state, wherein when the level of the airflow is detected by the first switch, a first port and a third port of the first switch are connected and the first switch is in the first state, wherein when no airflow is detected by the first switch, the first port and a second port of the first switch are connected and the first switch is in the second state, and wherein the first switch is a microphone switch.

2. The electronic vaporization device of claim 1, wherein the electric power is not provided when the two or more contact points are not physically connected to the object.

3. The electronic vaporization device of claim 1, further comprising:

a control circuit configured to control the provision of the electric power.

4. The electronic vaporization device of claim 3, wherein the control circuit comprises:

a detection circuit that detects whether the two or more contact points are physically connected to the object having a resistance within a predetermined range;

a power supply circuit that electrically couples the power source with the heater; and a starter circuit that controls the on or off of the power supply circuit;

wherein, if the resistance of the object is within the predetermined range, the starter circuit turns on the power supply circuit.

5. The electronic vaporization device of claim 4, wherein the control circuit further comprises an amplifier circuit that amplifies an electric signal detected by the detection circuit.

6. The electronic vaporization device of claim 1, wherein the electric power is configured to be switched off after a predetermined continuous duration.

7. The electronic vaporization device of claim 6, wherein the predetermined continuous duration is determined by a control circuit.

8. The electronic vaporization device of claim 1, wherein the electric power is not provided when the two or more contact points are physically connected to the object and the first switch is in the second state.

9. The electronic vaporization device of claim 1, wherein each of the two or more contact points comprises at least one of metal or alloy.

10. The electronic vaporization device of claim 1, further comprising:

a second switch disposed on the outside surface of the outer body of the electronic vaporization device, wherein the second switch is independent from the first switch.

11. The electronic vaporization device of claim 10, wherein the second switch comprises a press button, a push button, or an up-down switch.

12. The electronic vaporization device of claim 1, further comprising:

a second switch disposed on the outside surface of the outer body of the electronic vaporization device, wherein the second switch is configured to override the first switch to turn on and off the heater.

13. An electronic vaporization device, comprising:

a heater for heating a vaporizable material;

a compartment housing the vaporizable material, said compartment being thermally connected to the heater;

a power source providing electric power to the heater, said electric power being converted to thermal power;

two or more contact points disposed on an outside surface of an outer body of the electronic vaporization device;

a first switch having at least a first state and a second state, wherein the first switch is configured to detect an airflow through a mouthpiece of the electronic vaporization device and switch between the first state and the second state in response to a level of the airflow detected, and wherein the electric power is provided when the two or more contact points are physically connected to an object having a resistance within a predetermined range and the first switch is in the first state; and a second switch disposed on the outside surface of the outer body of the electronic vaporization device, wherein the second switch is independent from the first switch and configured to override the first switch to turn on and off the heater, wherein when the level of the airflow is detected by the first switch, a first port and a third port of the first switch are connected and the first switch is in the first state, wherein when no airflow is detected by the first switch, the first port and a second port of the first switch are connected and the first switch is in the second state, and wherein the first switch is a microphone switch.

* * * * *